Oct. 4, 1966

C. W. DONOGH 3,276,451

CHAFF SAVER FOR COMBINES

Filed June 1, 1964

INVENTOR
CHARLES W. DONOGH
BY
ATTORNEY

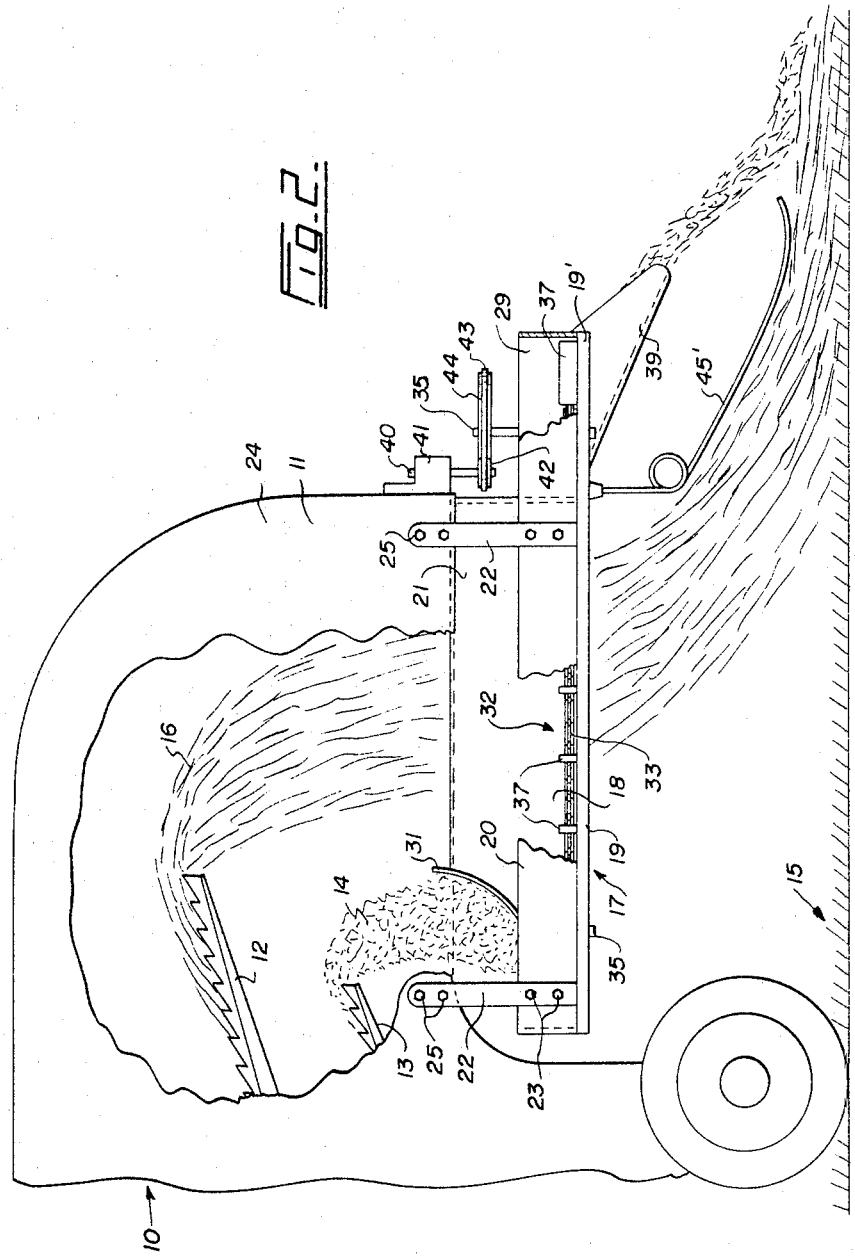

United States Patent Office 3,276,451
Patented Oct. 4, 1966

3,276,451
CHAFF SAVER FOR COMBINES
Charles W. Donogh, R.R. 1, Brandon,
Manitoba, Canada
Filed June 1, 1964, Ser. No. 371,614
16 Claims. (Cl. 130—26)

My invention relates to new and useful improvements in devices adapted to be attached to the rear ends of combines whereby the chaff can be saved to a relatively large extent.

Conventional combines normally separate the chaff from the straw, both of which are discharged from the rear hood of a combine. However, the chaff being smaller and finer, is separated downwardly by the sieves so that it is upon the lowermost of the two discharge devices and hence is discharged first, the straw being discharged rearwardly of the chaff.

This means that the chaff normally falls upon the stubble whereupon it is covered by the straw.

When conventional straw baling equipment follows the combine, the straw is picked up but the majority of the chaff, which is lying with the stubble, is missed.

Due to the relatively high feed costs at present existing, it is becoming desirable so save as much chaff as possible so that it can be incorporated within the straw bales and be used as feed.

I have accomplished this by providing means attached to the rear hood of the combine which routes the chaff from the combine, around the discharging straw and deposits same upon the straw bed so that the majority of it can be retained by the straw and be picked up by the straw baling equipment.

The principal object and essence of my invention is therefore to provide a device of the character herewithin described which intercepts the chaff as it is discharged from the combine and routes it around the straw to discharge it upon the upper surface of the straw.

Another object of the invention is to provide a device of the character herewithin described which does not interfere with the normal discharging action of the combine either insofar as straw is concerned or the chaff.

A yet further object of the invention is to provide a device of the character herewithin described which packs the straw downwardly upon the ground thus forming a relatively firm bed upon which the chaff can be discharged thus ensuring that a greater proportion of the chaff is saved.

Still another object of the invention is to provide a device of the character herewithin described which easily connects to a source of power operated by the combine.

A still further object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 2 is a fragmentary isometric elevation of the rear end of a combine with my device in situ.

In the drawings like characters of reference indicate corresponding parts in the different figures.

Figure 1:
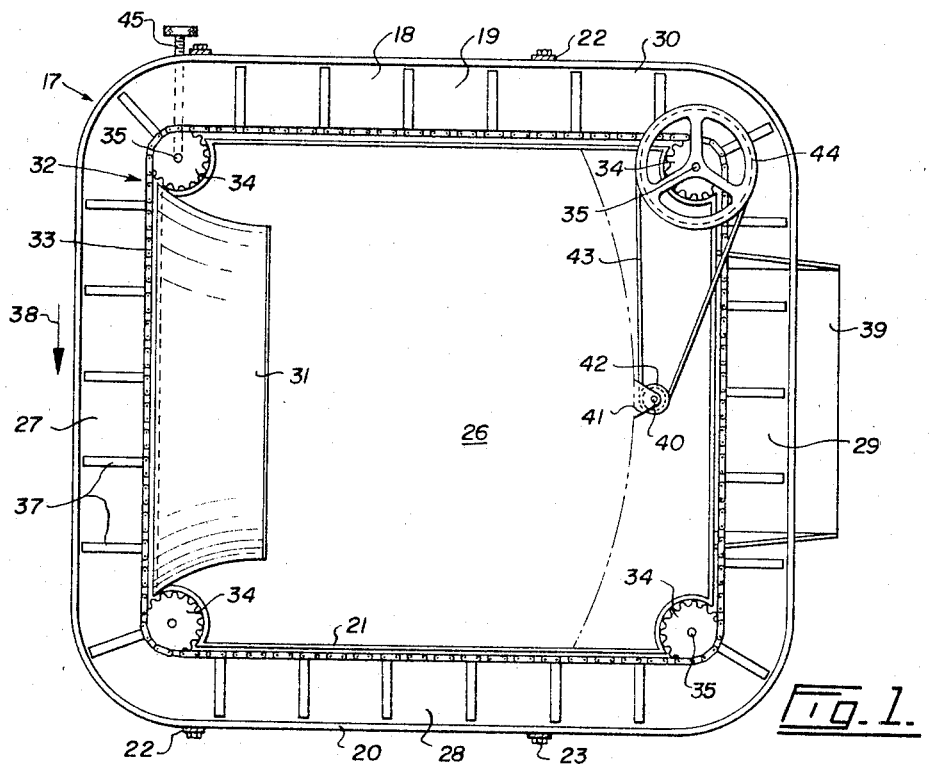
FIGURE 1 is a top plan view of my device per se.

Proceeding therefore to describe my invention in detail, reference character 10 represents the rear end of a combine having a downwardly situated discharge hood 11.

12 illustrates the straw deck discharge and 13 the chaff deck discharge of a conventional combine and it will be noted that the chaff 14 would normally be deposited downwardly upon the stubble within the area indicated by the reference charcter 15, to be followed by the straw 16 which would overlie both the stubble and the chaff.

My device collectively designated 17 is adapted to intercept the chaff 14 and route same around the discharging straw 16 to deposit same upon the upper surface of the straw as clearly shown in FIGURE 2 of the accompanying drawings.

The device 17 comprises a substantially rectangularly formed, open centered trough 18 having a planar base 19, and a pair of spaced and parallel upwardly extending walls 20 and 21, the wall 20 being the outer wall and the wall 21 being the inner wall. Both of these walls are secured to the edges of the base and extend upwardly therefrom.

Straps 22 are secured to the outer wall by means of bolts 23 and secure the device in spaced and parallel relationship beneath the discharge hood 11, the straps 22 being secured to the hood shroud 24 by means of bolts 25.

It will therefore be seen that the device, being open centered as at 26, permits the straw 16 to be discharged in the normal manner without interfering with this action in any way.

The trough 18 comprises a front chaff receiving run 27, a side chaff conveying run 28, a rear chaff discharge run 29, and a side return run 30.

Spanning the length of the front chaff receiving run is a curved chaff collecting shroud 31 which extends upwardly from the inner wall 21 into the discharging portion of the hood shroud 24 so that it intercepts the chaff 14 passing over the chaff discharge device 13. This causes the chaff to be received within the run 27 of the trough.

A conveyor collectively designated 32 is situated within the trough, said conveyor comprising an endless chain 33 extending around the trough and being routed upon chain sprockets 34 journalled for horizontal rotation upon spindles 35.

These sprockets are situated adjacent the inner corners 36 of the trough as clearly illustrated in FIG. 1.

Substantially rectangular paddles 37 are secured to the chain 33 at spaced intervals therearound and span the trough substantially as shown in FIGS. 1 and 2, so that movement of the conveyor in the direction of arrow 38 will sweep chaff received within the run 27 of the trough, around the side run 28, to the rear discharge run 29.

The base 19' of the rear discharge run 29 is provided with a downwardly extending discharge chute 39 so that the chaff swept by the paddles or bars 37 is deposited by gravity upon this chute and rearwardly of the discharging straw 16.

Once the chaff is discharged, the conveyor chain extends around the return run 30 to pick up chaff being deposited upon the chaff receiving run 27.

Conventional combines normally include a shaft 40 journalled within bearing 41 upon which a straw chopper and spreader may be secured, said shaft being connected to the source of power operating the combine.

I utilize this shaft and provide a V-pulley 42 upon the lower end thereof which, together with the V-belt 43 drives a pulley 44 secured upon one of the shafts 35 journalling sprocket 34 as shown in FIG. 1.

In this connection a conventional chain tightening device 45 adjusts the tension of the conveyor chain 33.

From the foregoing it will be appreciated that the chaff 14 is intercepted and routed around the discharging straw to be deposited via the chute 39 upon the upper surface of the straw 16 which has been deposited upon the stubble 15.

In order to form a good bed of straw to receive the chaff, I secure a plurality of resilient, spaced and parallel tines 45' upon the underside of the discharge run 29, said tines acting to press the discharging straw 16, firmly upon the ground thus forming a firm bed which will retain the majority of the chaff 14.

Figure 3:
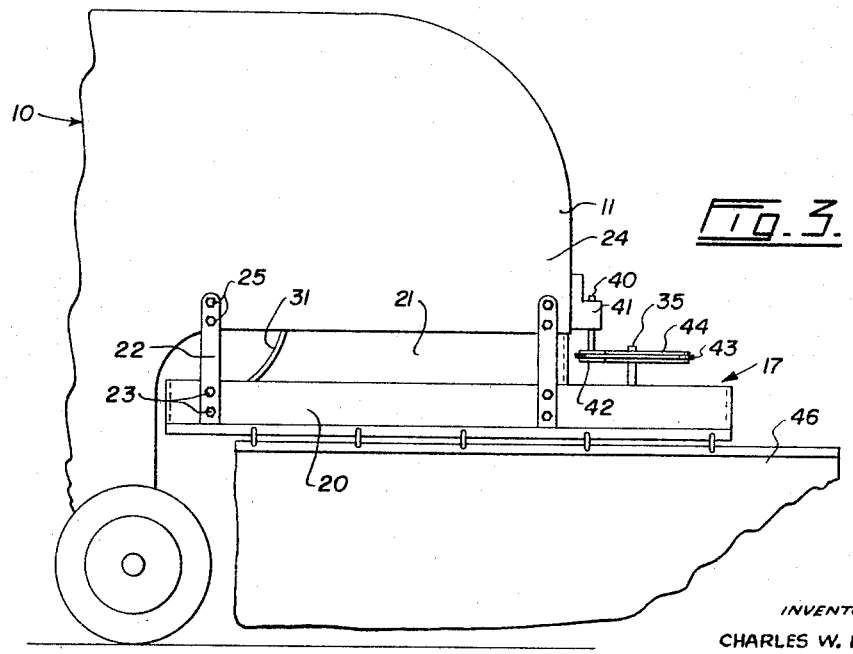
FIGURE 3 is a side view of a combine showing my device in situ together with a wind guard.

In the event that high winds are present, a depending canvas windshield 46 may be secured upon either side of the trough 17 as illustrated in FIG. 3.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A chaff saver for securement under the rear discharge hood of a combine, comprising in combination a perimetrically extending, open centered chaff trough, a chaff discharge chute at the rear side of said trough, means to attach said trough to the underside of said hood, means secured to said trough to deflect the chaff being discharged from said combine into said through, means in said trough to convey said chaff around said trough to said chaff discharge, a source of power for said last mentioned means, the straw from said combine being discharged through the open center of said trough, the chaff from said combine being discharged on the upper surface of said discharged straw.

2. The device according to claim 1 in which said trough is provided with a planar base and a pair of spaced and parallel side walls extending upwardly from said base, said means in said trough to convey said chaff around said trough consisting of an endless chain mounted for horizontal movement within said trough, a plurality of chain guide devices mounted in said trough around which said chain engages, said source of power being operatively connected to said chain, and means on said chain substantially spanning said trough for sweeping said chaff around said trough to said chaff discharge chute.

3. The device according to claim 2 in which said means on said chain comprises a plurality of substantially rectangular paddles secured by one edge thereof to said chain at spaced intervals therearound.

4. The device according to claim 3 which includes means secured to the rear side of said trough adapted to press the straw discharged from said combine, downwardly upon the ground, thereby forming a chaff receiving bed upon said straw.

5. The device according to claim 4 in which said means secured to the rear side of said trough comprises a plurality of spaced and parallel resilient, downwardly and rearwardly extending tines.

6. The device according to claim 5 in which said open centered chaff trough is formed substantially rectangular when viewed in plan having a front chaff receiving run, a side chaff conveying run, a rear chaff discharge run, and a side return run, said chain guide devices comprising chain sprockets journalled for rotation in a horizontal plane adjacent the inner corners of said trough whereby said chain runs adjacent the inner walls of said trough.

7. The device according to claim 2 which includes means secured to the rear side of said trough adapted to press the straw discharged from said combine, downwardly upon the ground, thereby forming a chaff receiving bed upon said straw.

8. The device according to claim 7 in which said means secured to the rear side of said trough comprises a plurality of spaced and parallel resilient, downwardly and rearwardly extending tines.

9. The device according to claim 8 in which said open centered chaff trough is formed substantially rectangular when viewed in plan having a front chaff receiving run, a side chaff conveying run, a rear chaff discharge run, and a side return run, said chain guide devices comprising chain sprockets journalled for rotation in a horizontal plane adjacent the inner corners of said trough whereby said chain runs adjacent the inner walls of said trough.

10. The device according to claim 2 in which said chain guide devices comprise chain sprockets journalled for rotation in a horizontal plane adjacent the inner corners of said trough whereby said chain runs adjacent the inner walls of said trough.

11. The device according to claim 2 in which said open centered chaff trough is formed substantially rectangular when viewed in plan having a front chaff receiving run, a side chaff conveying run, a rear chaff discharge run, and a side return run, said chain guide devices comprising chain sprockets journalled for rotation in a horizontal plane adjacent the inner corners of said trough whereby said chain runs adjacent the inner walls of said trough.

12. The device according to claim 1 which includes means secured to the rear side of said trough adapted to press the straw discharged from said combine, downwardly upon the ground, thereby forming a chaff receiving bed upon said straw.

13. The device according to claim 12 in which said means secured to the rear side of said trough comprises a plurality of spaced and parallel resilient, downwardly and rearwardly extending tines.

14. The device according to claim 13 in which said open centered chaff trough is formed substantially rectangular when viewed in plan having a front chaff receiving run, a side chaff conveying run, a rear chaff discharge run, and a side return run, said chain guide devices comprising chain sprockets journalled for rotation in a horizontal plane adjacent the inner corners of said trough whereby said chain runs adjacent the inner walls of said trough.

15. The device according to claim 12 in which said open centered chaff trough is formed substantially rectangular when viewed in plan having a front chaff receiving run, a side chaff conveying run, a rear chaff discharge run, and a side return run, said chain guide devices comprising chain sprockets journalled for rotation in a horizontal plane adjacent the inner corners of said trough whereby said chain runs adjacent the inner walls of said trough.

16. The device according to claim 1 in which said open centered chaff trough is formed substantially rectangular when viewed in plan having a front chaff receiving run, a side chaff conveying run, a rear chaff discharge run, and a side return run.

No references cited.

ABRAHAM G. STONE, *Primary Examiner.*

ANTONIO F. GUIDA, *Examiner.*